United States Patent [19]

Perry, Jr.

[11] 3,844,839
[45] Oct. 29, 1974

[54] FUEL CELL ELECTRODE

[75] Inventor: John Perry, Jr., New Shrewsbury, N.J.

[73] Assignee: The United States of America as represented by the Secretary of the Army, Washington, D.C.

[22] Filed: Oct. 11, 1972

[21] Appl. No.: 296,686

[52] U.S. Cl......... 136/86 D, 136/86 E, 136/120 FC
[51] Int. Cl..................... H01m 27/10, H01m 27/30
[58] Field of Search........... 136/86 D, 120 FC, 86 E

[56] References Cited
UNITED STATES PATENTS

| | | | |
|---|---|---|---|
| 3,097,974 | 7/1963 | McEvoy et al. | 136/86 D X |
| 3,291,753 | 12/1966 | Thompson | 136/86 D X |
| 3,350,294 | 10/1967 | Hall et al. | 136/86 D X |
| 3,368,922 | 2/1968 | Salyer | 136/86 |
| 3,391,028 | 7/1968 | Vose | 136/86 E |
| 3,410,729 | 11/1968 | Manion | 136/86 |

Primary Examiner—Winston A. Douglas
Assistant Examiner—Thomas A. Waltz
Attorney, Agent, or Firm—Eugene E. Stevens, III; Sheldon Kanars; Roy E. Gordon

[57] ABSTRACT

A porous iron plaque impregnated with palladium black is used as the anode of a hydrazine-air electrochemical cell.

This invention relates in general to fuel cell electrodes, and electrochemical cells containing the electrodes, and in particular, to an anode for a hydrazine-air electrochemical cell and to a hydrazine-air electrochemical cell containing the anode.

1 Claim, No Drawings

FUEL CELL ELECTRODE

BACKGROUND OF THE INVENTION

It is known that porous sintered nickel plaques that have been impregnated with palladium black can be used as anode electrodes in fuel cells such as a hydrazine-air electrochemical cell. The difficulty with the nickel electrode is that during the oxidation of hydrazine, larger amounts of ammonia are evolved. More specifically, the ammonia evolved during operation of the hydrazine-air battery has been found to be above tolerance levels in certain applications as for example, where the battery is part of a portable man pack unit.

SUMMARY OF THE INVENTION

The general object of this invention is to provide a fuel cell electrode suitable for use as the anode of a hydrazine-air electrochemical cell. A further object of the invention is to provide a hydrazine-air electrochemical cell in which the amount of ammonia generated is reduced when the cell is operating.

The foregoing objectives have been attained by using a porous iron plaque that has been impregnated with palladium black as the anode of a hydrazine-air electrochemical cell.

DESCRIPTION OF THE PREFERRED EMBODIMENT

A porous iron plaque 3 inches in length by 3 inches in width, 25 mils thick and about 60 percent porous is impregnated with 3 milligrams per square centimeter of plaque surface of palladium using a palladium chloride solution under vacuum. The plaque is washed with water to remove chloride ions and then dried in an oven.

The impregnated iron plaque is then tested in a single hydrazine-air cell using a solution of 2 molar hydrazine in 5 molar potassium hydroxide. The electrode shows no gassing on open circuit and very low gassing during cell operation. Analysis of evolved gas from the cell with iron-palladium anode shows evolution rates of ammonia of more than one magnitude less than a cell using a nickel-palladium anode. That is, a test cell with the nickel-palladium anode operating over a 16 hour period generates ammonia at a rate of 0.003 gram per hour. The cell with the iron-palladium anode operating under similar conditions generates ammonia at a rate of 0.0002 gram per hour.

I wish it to be understood that I do not desire to be limited to the exact details of construction shown and described, for obvious modifications will occur to a person skilled in the art.

What is claimed is:

1. A hydrazine-air electrochemical cell in which the amount of ammonia generated is reduced when the cell is operating, said electrochemical cell including an approximate 60 percent porous iron plaque impregnated with about 3 milligrams per square centimeter of palladium black as the anode, an air cathode, and an anolyte for the electrodes, said anolyte comprising a solution of 2 molar hydrazine in 5 molar potassium hydroxide.

* * * * *